United States Patent
Neser

(10) Patent No.: US 10,867,518 B2
(45) Date of Patent: Dec. 15, 2020

(54) METHOD AND SYSTEM FOR IDENTIFYING LOCATION OF A PARKED VEHICLE

(71) Applicant: UBICQUIA IQ LLC, Melbourne, FL (US)

(72) Inventor: Morne Neser, Lachine (CA)

(73) Assignee: UBICQUIA IQ LLC, Melbourne, FL (US)

(*) Notice: Subject to any disclaimer, the term of this patent is extended or adjusted under 35 U.S.C. 154(b) by 0 days.

(21) Appl. No.: 15/692,263

(22) Filed: Aug. 31, 2017

(65) Prior Publication Data

US 2019/0066517 A1 Feb. 28, 2019

(51) Int. Cl.
| | |
|---|---|
| *B60Q 1/48* | (2006.01) |
| *G08G 1/00* | (2006.01) |
| *G06K 9/32* | (2006.01) |
| *G06F 3/00* | (2006.01) |
| *H04N 7/04* | (2006.01) |
| *H04N 7/18* | (2006.01) |
| *G08G 1/005* | (2006.01) |

(52) U.S. Cl.
CPC ............ *G08G 1/205* (2013.01); *G06F 3/00* (2013.01); *G06K 9/3233* (2013.01); *G08G 1/005* (2013.01); *H04N 7/04* (2013.01); *H04N 7/188* (2013.01); *G06K 2209/23* (2013.01)

(58) Field of Classification Search
CPC ........ G08G 1/205; G08G 1/005; G08G 1/145; G06F 3/00; H04N 7/04; H04N 7/188; H04N 7/183; G06K 9/3233; G06K 2209/23; G06K 9/00771; G06K 9/00812
See application file for complete search history.

(56) References Cited

U.S. PATENT DOCUMENTS

| | | | |
|---|---|---|---|
| 7,893,848 B2 | 2/2011 | Chew | |
| 2006/0106504 A1* | 5/2006 | Carpenter | .............. G08G 1/017 701/1 |
| 2010/0272317 A1 | 10/2010 | Riesco Prieto et al. | |

(Continued)

FOREIGN PATENT DOCUMENTS

| | | |
|---|---|---|
| CN | 102915638 A | 2/2013 |
| KR | 10-2012-0019526 A | 3/2012 |
| KR | 10-2013-0131574 A | 12/2013 |

OTHER PUBLICATIONS

International Search Report and Written Opinion issued in connection with corresponding PCT Application No. PCT/US2018/042720 dated Nov. 7, 2018, 12pgs.

*Primary Examiner* — An T Nguyen
(74) *Attorney, Agent, or Firm* — Seed IP Law Group LLP

(57) ABSTRACT

Provided is a method and system that includes an imaging device disposed within a parking area, and configured to capture one or more images of a parked vehicle, and monitor a location of the parked vehicle a remote computing device in wireless communication with the image device. The remote computing device is configured to transmit and receive parking data from the image device. Also included is a software module accessible via a user device for controlling and displaying the one or more images of the parked vehicle to a user. The user selects the parked vehicle to be monitored, and the imaging device monitors the parked vehicle to determine whether the parked vehicle has been moved or is parked illegally and wirelessly transmits a notification to the user.

19 Claims, 3 Drawing Sheets

(56) References Cited

U.S. PATENT DOCUMENTS

| | | | |
|---|---|---|---|
| 2013/0182110 A1* | 7/2013 | Tziperman | H04N 7/18 348/148 |
| 2014/0036076 A1* | 2/2014 | Nerayoff | G06Q 50/30 348/148 |
| 2015/0022663 A1* | 1/2015 | Wang | B60R 25/102 348/148 |
| 2015/0063646 A1* | 3/2015 | Wang | G06K 9/00812 382/104 |
| 2017/0116790 A1* | 4/2017 | Kusens | G06Q 30/0284 |
| 2017/0166115 A1* | 6/2017 | Pal | G08G 1/163 |
| 2017/0263124 A1* | 9/2017 | Li | G08G 1/0968 |
| 2017/0330460 A1* | 11/2017 | Massey | G08G 1/149 |

* cited by examiner

METHOD AND SYSTEM FOR IDENTIFYING LOCATION OF A PARKED VEHICLE

I. TECHNICAL FIELD

The present invention relates generally to a method and system for identifying a location of a parked vehicle using imaging technology. In particular, the present invention relates to wirelessly identifying the location of a parked vehicle.

II. BACKGROUND

Today, when parking vehicles in high volume, metropolitan areas it can be difficult to locate your vehicle or determine if the vehicle has been moved without the knowledge of the vehicle operator. One existing parking system, for example, in a parking garage, enables a vehicle operator to know where an empty parking space is by posting location information at the entrance of the garage, so that when the vehicle operator pulls into the entrance of the garage they can find the empty parking space. This system therefore monitors parked vehicles and vacant parking spaces.

Another parking system includes a parking attendant manually monitoring the parked vehicles and determining whether a vehicle has been parked illegally, however it is difficult for a parking attendant to determine whether a vehicle has been stolen if the parking attendant does not recognize the vehicle operator.

III. SUMMARY OF THE EMBODIMENTS

Given the aforementioned deficiencies, needed is a method and system for identifying, in real-time and wirelessly parked vehicles by location and notifying a vehicle operator or parking authority of the location. Is a system that further enables a notification of unauthorized movement of a parked vehicle to be sent to the vehicle operator or parking authority.

In embodiments of the present invention, a system is provided including an imaging device disposed within a parking area, and capturing one or more images of a parked vehicle. The system also includes a remote computing device in wireless communication with the image device, and transmitting and receiving parking data from the image device, and a software module accessible via a user device for controlling and displaying the parking data to a user.

Other embodiments provide a method that includes detecting, via an imaging device, in real-time, a location of a parked vehicle when parked by a user. The method also includes capturing an image of the location of the parked vehicle, and displaying, via a user device, image of the location of the parked vehicle. The parked vehicle is selected, at the user device, the parked vehicle. Also included is storing the location information and monitoring a status of the location of the parked vehicle, detecting, via the imaging device, when the parked vehicle has been moved or canceling, via the user device, monitoring of the parked vehicle.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

IV. DESCRIPTION OF THE DRAWINGS

Figure 1:
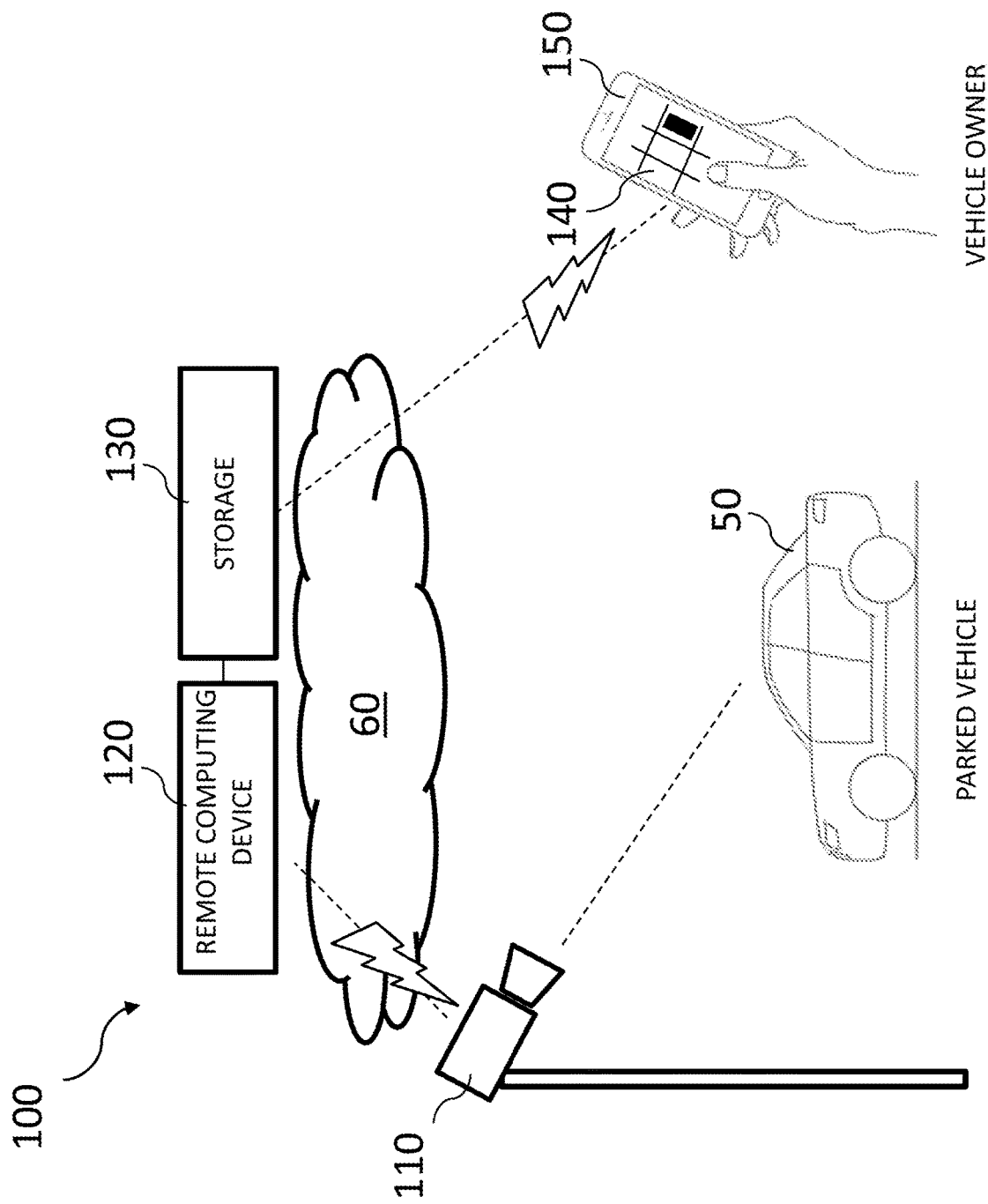
FIG. 1 is a schematic a parking system that can be implemented within one or more embodiments of the present invention.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

V. DETAILED DESCRIPTION OF THE EMBODIMENTS

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components.

In other instances, well-known components, apparatuses, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

As noted above, the embodiments provide methods and system for identifying the location of parked vehicles. The methods can be performed wirelessly between an imaging device disposed a predetermined distance from the parked vehicles and a remoting computing device, and a user device, over a communication network. The methods can detect when a parked vehicle has been moved without the knowledge of the vehicle operator or when the parked vehicle has been parked illegally. The methods can be performed over a communication network such as Wifi, Internet, Bluetooth, 802.11, 802.15 and cellular networks.

As shown in FIG. 1, a system 100 includes an imaging device 110, a remote computing device 120, and a storage medium 130. A software module application 140 is accessible by a user device 150.

The imaging device 110 is disposed a predetermined distance from parked vehicles e.g., a parked vehicle 50. The imaging device 110 can be implemented within existing street light fixtures, or any other suitable parking monitoring systems to perform the methods of embodiments of the present invention. According to an embodiment of the present invention, a plurality of imaging devices 110 can be provided for monitoring parking spaces in different directions.

The imaging device 110 detects and captures images of the parked vehicle 50 and processes the data obtained therein. The images can be time-stamped. The processing can be performed by vehicle detection software analyze the image data. This software can be implemented locally within the light fixture (e.g., via a sensor) or the image data can be uploaded to an external computing device (e.g., a server) for remote processing.

The remote computing device 120 wirelessly communicates with the imaging device 110 in real-time to obtain image data related to a location of the parked vehicle 50. The wireless communication can be performed in a cloud environment 60, or over wireless networks as mentioned above. The remote computing device 120 can be a web server or physical computing device housed in a remote location such as a control room within a parking authority.

The remote computing device 120 is in communication with the storage medium 130 for storing image data received from the imaging device 110 and for storing parking rules and information and control instructions for operating the system 100. According to an embodiment of the present invention, the remote computing device 120 can include a centralized server or distributed cloud computing can be utilized to perform the remote image processing for vehicle detection.

According to an embodiment of the present invention, the remote computing device 120 and the storage medium 130 can be a part of the cloud environment 60 or located together or separately in remote location(s).

The system 100 includes the software module application 140, accessible via a user device 150 (e.g., of the parking authority or a vehicle operator) to control the system 100, and to display image data thereon. A user accesses the software module application 140 via inputs of the user device 150 and controls operation of the software module application 140.

Upon parking the vehicle 50, and accessing the software module application 140 at the user device 150, the system 100 detects the parked vehicle 50, captures an image of the parked vehicle 50 and then displays it at the user device 150. The software module application 140 can be a mobile application, and the user device 150 can be a mobile device, for example. The system 100 monitors the location of the parked vehicle 50, and notifies the user when the vehicle has been moved or the user has cancelled the monitoring process at the user device 150. Therefore, the system 100 can detect when a parked vehicle 50 has been moved without the knowledge of the user/vehicle operator.

According to another embodiment, the system 100 monitors the location of the parked vehicle 50 based on parking rule information, schedules etc., stored at the storage medium 130. If it is determined that the parked vehicle violates the parking rules, the system 100 notifies the user that the vehicle 50 is parked illegally. The user can also cancel monitoring of the parked vehicle 50 at the user device 150, when desired.

Figure 2:
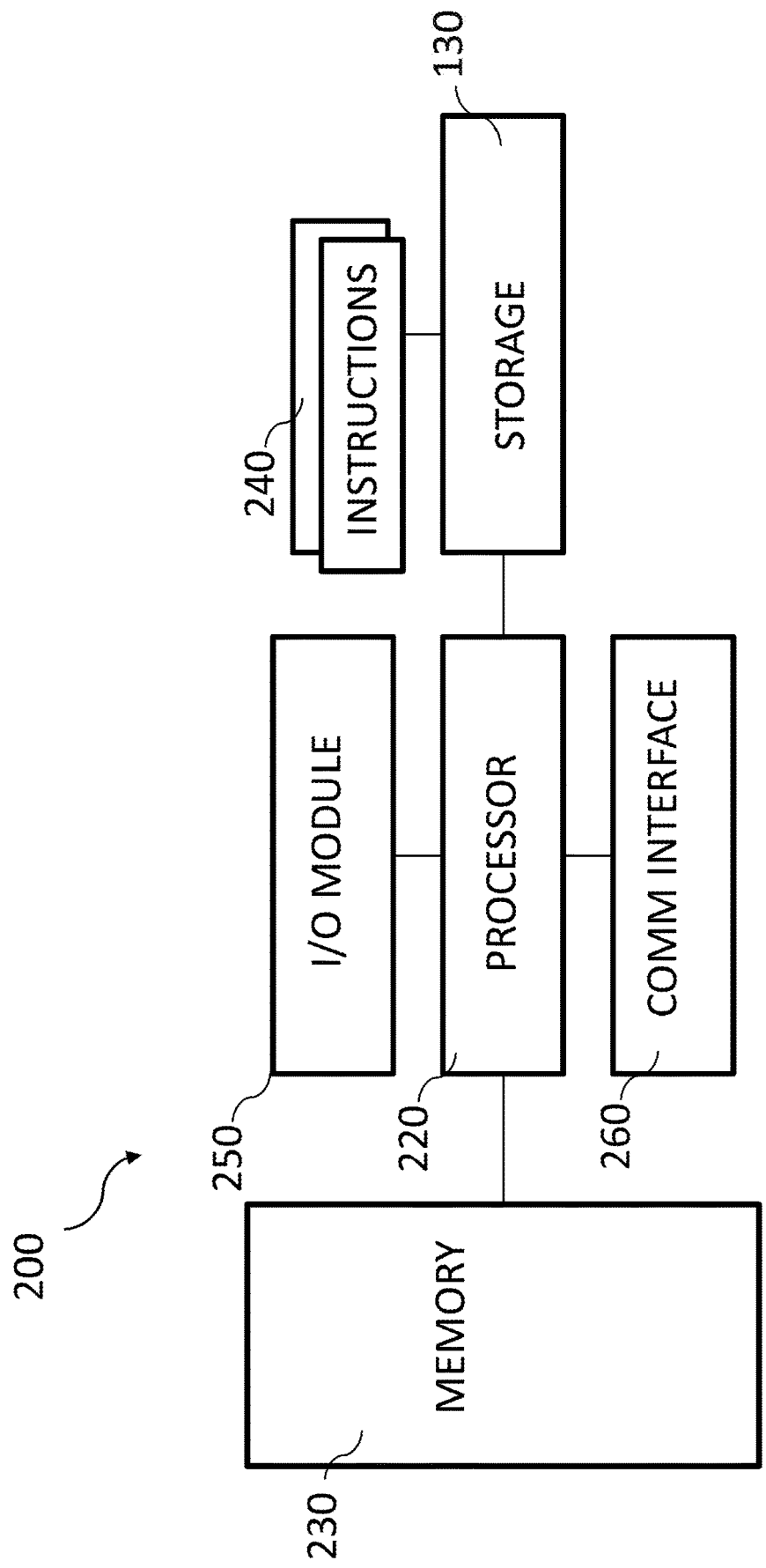
FIG. 2 is a block diagram illustrating an example of the remote computing device of FIG. 1 that can be implemented within one or more embodiments of the present invention.

FIG. 2 is a block diagram of an example of a computing device 200 that can be implemented as the remote computing device 120 shown in FIG. 1. The computing device 200 can include a processor 220 with a specific structure. The specific structure is imparted to the processor 220 by instructions stored in an internal memory 230 included therein. The structure can also be imparted by instructions 240 that can be fetched by the processor 220 from a storage medium 130.

The storage medium 130 may be co-located with computing device as shown, or it may be located elsewhere and be communicatively coupled to the computing device 200.

The computing device 200 may include one or more hardware and/or software components configured to fetch, decode, execute, store, analyze, distribute, evaluate, diagnose, and/or categorize information. Furthermore, the computing device 200 can include an (input/output) I/O module 250 that can be configured to interface with a plurality of remote devices including sensors. The computing device 200 is calibrated during installation so that sensor detection corresponds to a known physical location (e.g., geo-location on a map).

The processor 220 may include one or more processing devices or cores (not shown). In some embodiments, the processor 220 can be a plurality of processors, each having either one or more cores. The processor 220 can be configured to execute instructions fetched from the memory 230, or the instructions may be fetched from storage medium 130, or from a remote device connected to computing device via a communication interface 260.

Furthermore, without loss of generality, the storage medium 130 and/or the memory 230 may include a volatile or non-volatile, magnetic, semiconductor, tape, optical, removable, non-removable, read-only, random-access, or any type of non-transitory computer-readable computer medium. The storage medium 130 and/or the memory 3040 may include programs and/or other information that may be used by the processor 220.

Moreover, the storage medium 130 may be configured to log data processed, recorded, or collected during the operation of the computing device 200. For example, the storage medium 130 may store historical patterns, predetermined thresholds, for each of the measurable variables associated with one or more electric machines coupled to the computing device 200. The data may be time-stamped, location-stamped, cataloged, indexed, or organized in a variety of ways consistent with data storage practice.

Figure 3:
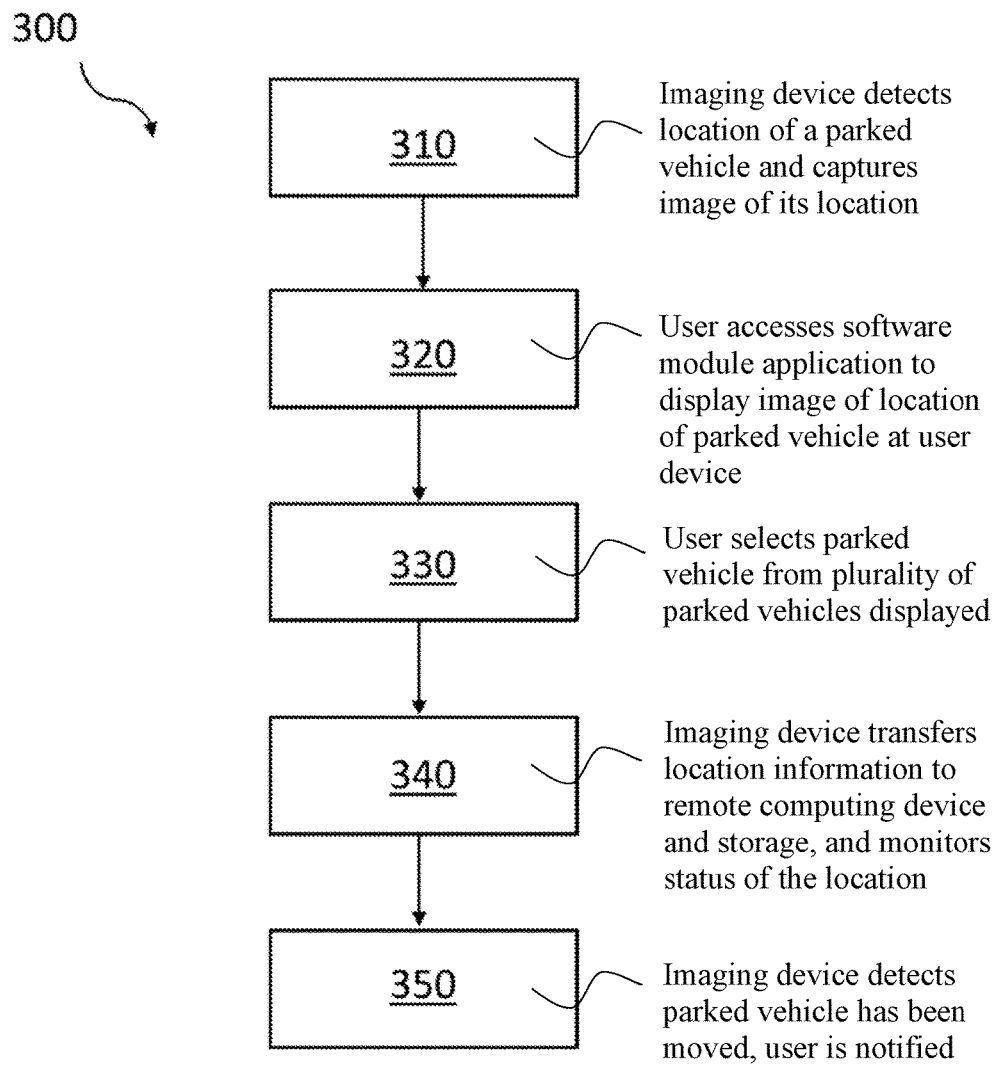
FIG. 3 is a flow diagrams illustrating a method for detecting a parked vehicle that can be implemented within one or more embodiments of the present invention.

FIG. 3 is a flow diagram illustrating a method 300 for detecting a parked vehicle that can be implemented within one or more embodiments of the present invention. Upon a user parking a vehicle, the method 300 begins at operation 310 where an imaging device, detects in real-time, a location of a parked vehicle, and capturing an image of the location of the parked vehicle.

When the user accesses a software module application 140 at operation 320, the image of the location of the parked vehicle 50 is displayed at a user device 150. From operation 320, the process continues to operation 330, where the user selects the parked vehicle from a plurality of parked vehicles displayed, and at operation 340 the imaging device transfers the location information to a remote computing device and storage to be stored.

At operation 340, the imaging device continuously or periodically monitors a status of the location of the parked vehicle. For example, the monitoring and analyzing can be performed at a configurable frequency ranging from every frame of a video feed to minutes, depending on processing power and data transfer bandwidth availability.

The method 300 then continues to operation 350 where when the imaging device detects that the parked vehicle has been moved, the user is notified via the user device 150 via an audible or visual notification (e.g., alarm, phone call, text message, etc.), or the monitoring continues until, the user selects to cancel the monitoring process via the user device 150.

Alternatively, in accordance with another embodiment, at operation 340 the imaging device may continuously or periodically monitor a status of the location of the parked vehicle based on the parking rules and information, and then in operation 350 detect when the parked vehicle is located outside a predetermined parking range, and notifying the user when parking is illegal.

Embodiments of the present invention, provides the advantages of a user being able to have their parked vehicle monitored in order to be informed of movement of the vehicle without their knowledge. In addition, the system and method provide the advantage of notifying the vehicle owner and/or parking authority of any parking violations.

This written description uses examples to disclose the invention including the best mode, and also to enable any person skilled in the art to practice the invention, including making and using any devices or apparatuses and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system, comprising:
    an imaging device electromechanically coupled to a street light fixture, the streetlight fixture disposed within a parking area, and the imaging device configured to capture one or more images of a parked vehicle;
    a remote computing device in wireless communication with the imaging device, and configured to transmit and receive image data from the imaging device;
    a storage configured to store parking rule information and the image data received; and
    a software module operating within the imaging device accessible via a user device of a parking authority, the software module arranged to:
        receive a selection of the parked vehicle to be monitored from a parking authority user;
        control the display of the one or more images of the parked vehicle to the parking authority user;
        monitor the parked vehicle to determine whether the parked vehicle is parked illegally based on the parking rule information, wherein the monitoring occurs at a rate based at least in part on a processing power of the imaging device, and wherein the determination whether the parked vehicle is parked illegally is based, at least in part, on a determination that the parked vehicle is located outside of a predetermined parking range;
        direct wireless transmission of an alert notification to a portable user device of the parking authority user in response to a determination that the parked vehicle is parked illegally.

2. The system of claim 1, wherein the software module operating within imaging device is electromechanically coupled to the street light fixture is further arranged to direct wireless transmission of a parking violation alert to an operator of the parked vehicle.

3. The system of claim 1, wherein the imaging device further comprises:
    a camera device configured to capture the one or more images;
    a communication interface configured to facilitate transmitting and receiving of image data with the remote computing device.

4. The system of claim 1, wherein the remote computing device is further configured to wirelessly communicate with the imaging device in real-time to obtain image data related to the one or more images captured.

5. The system of claim 4, wherein the wireless communication is performed in a cloud environment.

6. The system of claim 1, wherein the software module is a mobile application and the user device is a mobile device.

7. The system of claim 1, wherein the system monitors the location of the parked vehicle continuously via the imaging device and the imaging device periodically captures the one or more images of the parked vehicle as desired by the user.

8. The system of claim 4, wherein the remote computing device comprises:
    a processor configured to process the image data received, and transmit the image data to external systems for further analysis.

9. A method, comprising:
    performing, via a software module operating in an imaging device that is electromechanically coupled to a street light fixture, processing that includes:
    detecting, in real-time, a location of a parked vehicle;
    capturing one or more images of the location of the parked vehicle;
    controlling display of an image of the location of the parked vehicle to a parking authority user device;
    receiving selection of the parked vehicle from the parking authority device;
    storing the location information;
    monitoring a status of the location of the parked vehicle, wherein the monitoring occurs at a rate based at least in part on a processing power of the imaging device, and wherein the status includes a detection that the parked vehicle is parked illegally outside of a predetermined parking range based at least in part on stored parking rule information;
    receiving an indication canceling monitoring of the parked vehicle from the portable user device of the parking authority; and
    wirelessly transmitting an alert notification to a portable user device of the parking authority user in response to the status.

10. The method of claim 9, wherein detecting the location of the parked vehicle comprises:
    sensing, via one or more sensors the location of the parked vehicle; and
    transmitted the sensed data to a camera device of the imaging device, and initiating the capture of the one or more images.

11. The method of claim 9, further comprising:
    wirelessly communicating, between a remote computing device and the imaging device in real-time, to obtain image data related to the one or more images captured.

12. The method of claim 11, wherein the wireless communication is performed in a cloud environment.

13. The method of claim 9, wherein monitoring further comprises:
    continuously monitoring, the location of the parked vehicle via the imaging device and periodically capturing the one or more images of the parked vehicle as desired by the user.

14. A device, comprising:
    an imaging device electromechanically coupleable to a street light fixture;

a software module disposed within the imaging device, the software module arranged to perform processing including:
  detecting in real-time, a location of a parked vehicle that was parked by a user;
  capturing one or more images of the location of the parked vehicle;
  controlling display of an image of the location of the parked vehicle to a parking authority user device;
  receiving a selection indicating the parked vehicle from the parking authority device;
  storing the location information;
  monitoring a status of the location of the parked vehicle, wherein the monitoring occurs at a rate based at least in part on a processing power of the imaging device, and wherein the status includes a detection that the parked vehicle is parked illegally outside of a predetermined parking range based at least in part on the parking rules and information; and
  wirelessly transmitting an alert notification to the parking authority user device in response to the status.

15. The device of claim 14, further comprising:
  one or more sensors arranged to sense the location of the parked vehicle; and
  a camera device of the imaging device arranged to the capture of the one or more images.

16. The device of claim 14, further comprising:
  a communication interface arrange for wirelessly communicating, between a remote computing device and the imaging device in real-time, image data related to the one or more images captured.

17. The device of 16, wherein the wireless communication is performed in a cloud environment.

18. The device of claim 14, wherein monitoring further comprises:
  continuously monitoring the status of the location of the parked vehicle via the imaging device; and
  periodically capturing the one or more images of the parked vehicle as desired by the user.

19. The system of claim 1, wherein the alert notification is wirelessly transmitted via a cellular network or via the Internet.

* * * * *

UNITED STATES PATENT AND TRADEMARK OFFICE
CERTIFICATE OF CORRECTION

PATENT NO. : 10,867,518 B2  
APPLICATION NO. : 15/692263  
DATED : December 15, 2020  
INVENTOR(S) : Morne Neser Page 1 of 1

It is certified that error appears in the above-identified patent and that said Letters Patent is hereby corrected as shown below:

In the Claims

<u>Column 8, Claim 16, Line 7:</u>
"arrange" should read, --arranged--.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*